US011392679B2

United States Patent
Guo

(10) Patent No.: US 11,392,679 B2
(45) Date of Patent: *Jul. 19, 2022

(54) CERTIFICATE VERIFICATION

(71) Applicant: Advanced New Technologies Co., Ltd., Grand Cayman (KY)

(72) Inventor: Mingyu Guo, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 0 days.

This patent is subject to a terminal disclaimer.

(21) Appl. No.: 17/394,134

(22) Filed: Aug. 4, 2021

(65) Prior Publication Data

US 2021/0365536 A1   Nov. 25, 2021

Related U.S. Application Data

(63) Continuation of application No. 17/164,578, filed on Feb. 1, 2021, now Pat. No. 11,086,977, which is a (Continued)

(30) Foreign Application Priority Data

May 7, 2019   (CN) .......................... 201910374005.3

(51) Int. Cl.
  *G06F 21/33*  (2013.01)
  *G06N 5/04*   (2006.01)
  (Continued)

(52) U.S. Cl.
  CPC ............... *G06F 21/33* (2013.01); *G06N 5/04* (2013.01); *G06T 7/001* (2013.01); *G06T 7/136* (2017.01)

(58) Field of Classification Search
  CPC .......... G06F 21/33; G06N 5/04; G06N 7/005; G06T 7/001; G06T 7/136
  See application file for complete search history.

(56) References Cited

U.S. PATENT DOCUMENTS

| 5,347,111 A | 9/1994 | Hoshino |
| 5,497,227 A | 5/1996 | Takeuchi et al. |

(Continued)

FOREIGN PATENT DOCUMENTS

| CN | 107729847 | 2/2018 |
| CN | 107832679 | 3/2018 |

(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.

(Continued)

*Primary Examiner* — Darren B Schwartz
(74) *Attorney, Agent, or Firm* — Fish & Richardson P.C.

(57) ABSTRACT

A computer-implemented certificate verification method includes: obtaining, by a certificate verification module, at least two images of a certificate, in which the at least two images are acquired under different acquisition conditions; obtaining, from the at least two images, at least two target images that correspond to respective images of the at least two images and that each include an image of a light-reflective coating of the certificate; and determining, based on the at least two target images, a probability that the certificate is an original.

21 Claims, 5 Drawing Sheets

Related U.S. Application Data continuation of application No. 16/945,778, filed on Jul. 31, 2020, now Pat. No. 10,909,227, which is a continuation of application No. 16/807,914, filed on Mar. 3, 2020, now Pat. No. 10,769,263, which is a continuation of application No. PCT/CN2020/071608, filed on Jan. 12, 2020.

(51) Int. Cl.
*G06T 7/00* (2017.01)
*G06T 7/136* (2017.01)

(56) References Cited

U.S. PATENT DOCUMENTS

| | | | |
|---|---|---|---|
| 5,751,412 | A | 5/1998 | Duell et al. |
| 5,772,248 | A | 6/1998 | Phillips |
| 6,019,287 | A | 2/2000 | Mann |
| 6,905,755 | B1 | 6/2005 | Nemeth |
| 7,162,052 | B2 | 1/2007 | Brundage et al. |
| 7,284,270 | B2 | 10/2007 | Kitamura et al. |
| 7,454,797 | B2 | 11/2008 | Zhu et al. |
| 8,648,902 | B2 | 2/2014 | Kanamori |
| 8,844,802 | B2 | 9/2014 | Fedorovskaya et al. |
| 8,917,386 | B2 | 12/2014 | Holl et al. |
| 9,147,127 | B2 | 9/2015 | Shu |
| 9,153,005 | B2 | 10/2015 | Tremolada et al. |
| 9,888,451 | B2 | 2/2018 | Ido et al. |
| 10,032,042 | B1* | 7/2018 | Eckel ............... G06F 21/34 |
| 10,235,597 | B2 | 3/2019 | Voigt |
| 10,325,374 | B1 | 6/2019 | Mayer |
| 10,332,243 | B2 | 6/2019 | Berge et al. |
| 10,385,514 | B1 | 8/2019 | Jones |
| 10,440,016 | B2 | 10/2019 | Oberheide et al. |
| 10,452,908 | B1 | 10/2019 | Ramanathan |
| 10,482,303 | B2 | 11/2019 | Soborski |
| 10,489,685 | B1 | 11/2019 | Rubin et al. |
| 10,769,263 | B1 | 9/2020 | Guo |
| 10,899,160 | B1* | 1/2021 | Jones ................. B42D 25/455 |
| 10,909,227 | B2 | 2/2021 | Guo |
| 2002/0157005 | A1 | 10/2002 | Brunk et al. |
| 2003/0099379 | A1* | 5/2003 | Monk ............. G06K 9/00442 |
| | | | 382/115 |
| 2003/0138135 | A1 | 7/2003 | Chung et al. |
| 2003/0152252 | A1 | 8/2003 | Kondo |
| 2003/0168849 | A1 | 9/2003 | Reinisch |
| 2004/0158724 | A1 | 8/2004 | Carr |
| 2006/0138243 | A1 | 6/2006 | Bi |
| 2007/0023494 | A1 | 2/2007 | Haraszti |
| 2007/0080533 | A1 | 4/2007 | Bleikholm |
| 2007/0122022 | A1 | 5/2007 | Shimizu et al. |
| 2007/0170257 | A1 | 7/2007 | Haraszti |
| 2008/0025555 | A1 | 1/2008 | Visan et al. |
| 2008/0060079 | A1 | 3/2008 | Shimizu et al. |
| 2008/0130942 | A1 | 6/2008 | Kitani et al. |
| 2008/0178302 | A1 | 7/2008 | Brock et al. |
| 2011/0126296 | A1* | 5/2011 | Moore ................... G06F 21/31 |
| | | | 726/28 |
| 2012/0023335 | A1 | 1/2012 | Bals et al. |
| 2014/0270336 | A1 | 9/2014 | Eckel et al. |
| 2014/0363057 | A1 | 12/2014 | Eckel et al. |
| 2015/0063673 | A1 | 3/2015 | Bu |
| 2015/0090777 | A1 | 4/2015 | Cho |
| 2015/0332082 | A1* | 11/2015 | King ..................... B42D 25/00 |
| | | | 382/116 |
| 2015/0341370 | A1* | 11/2015 | Khan ................. H04L 63/0861 |
| | | | 726/30 |
| 2016/0307035 | A1 | 10/2016 | Schilling |
| 2016/0350592 | A1 | 12/2016 | Ma |
| 2017/0046824 | A1 | 2/2017 | Klimovski |
| 2017/0309108 | A1* | 10/2017 | Sadovsky ............. G07D 7/206 |
| 2017/0344823 | A1* | 11/2017 | Withrow ............... G06F 21/30 |
| 2017/0372322 | A1 | 12/2017 | Morey |
| 2018/0012094 | A1 | 1/2018 | Wu |
| 2018/0060874 | A1* | 3/2018 | Kelts ................... G06Q 30/018 |
| 2018/0126769 | A1 | 5/2018 | Rodriquez et al. |
| 2018/0186164 | A1 | 7/2018 | Wu |
| 2019/0087942 | A1 | 3/2019 | Ma |
| 2019/0102873 | A1 | 4/2019 | Wang |
| 2019/0278977 | A1* | 9/2019 | Zheng ................ G06K 9/00288 |
| 2019/0286902 | A1* | 9/2019 | Rowe .................... H04L 9/3226 |
| 2019/0311102 | A1* | 10/2019 | Tussy ..................... G06F 21/34 |
| 2019/0311240 | A1* | 10/2019 | Wicker ................. G07D 7/202 |
| 2019/0372968 | A1 | 12/2019 | Balogh |
| 2020/0175290 | A1 | 6/2020 | Raja |
| 2020/0311365 | A1* | 10/2020 | Cottrill ............ G06K 19/06084 |
| 2020/0364322 | A1 | 11/2020 | Guo |
| 2021/0157891 | A1 | 5/2021 | Guo |

FOREIGN PATENT DOCUMENTS

| | | |
|---|---|---|
| CN | 108229499 | 6/2018 |
| CN | 109543551 | 3/2019 |
| CN | 110263805 | 9/2019 |
| EP | 2930640 | 10/2015 |

OTHER PUBLICATIONS

Nakamoto, "Bitcoin: A Peer-to-Peer Electronic Cash System," www.bitcoin.org, 2005, 9 pages.

PCT International Search Report and Written Opinion in International Appln No. PCT/CN2020/071608, dated Apr. 7, 2020, 16 pages 9 (with partial machine translation).

PCT International Preliminary Report on Patentability in International Appln No. PCT/CN2020/071608, dated Nov. 2, 2021, 11 pages (with English translation).

* cited by examiner

CERTIFICATE VERIFICATION

CROSS-REFERENCE TO RELATED APPLICATIONS

This application is a continuation of and claims the benefit of priority of U.S. patent application Ser. No. 17/164,578, filed Feb. 1, 2021, which is a continuation of and claims the benefit of priority of U.S. patent application Ser. No. 16/945,778, filed Jul. 31, 2020, which is a continuation of and claims the benefit of priority of U.S. patent application Ser. No. 16/807,914, filed Mar. 3, 2020, now U.S. Pat. No. 10,769,263, which is a continuation of PCT Application No. PCT/CN2020/071608, filed on Jan. 12, 2020, which claims priority to Chinese Patent Application No. 201910374005.3, filed on May 7, 2019, and each application is hereby incorporated by reference in their entirety.

TECHNICAL FIELD

The present specification relates to the field of computer technologies, and in particular to methods, apparatuses, and devices for certificate verification and identity verification.

BACKGROUND

During Know Your Customer (KYC) electronic real-name authentication, users usually need to photograph identity certificates (such as identity cards, passports, etc.) and upload photos. However, the photographing process may not be effectively monitored. For example, it may not be determined whether the photographed identity certificate is an original, and whether the photographed identity certificate is legally held, leaving vulnerability for attackers (also referred to as black industry users). In other words, black industry users can photograph forged certificates to obtain photos to be uploaded, thereby deceiving the electronic authentication process. The methods for forging certificates by black industry users usually include forging a physical certificate and forging an electronic certificate. Forging a physical certificate refers to modifying information directly on a physical entity of an original certificate, for example, altering content (such as a name, a certificate number, etc.) on a surface of the certificate, pasting and covering the content (such as a portrait photo, a certificate identifier, etc.) on the surface of the certificate. Forging an electronic certificate refers to first digitizing an original certificate through photographing, scanning, etc., then altering information on an obtained digitized certificate image by using an image processing tool, and finally presenting the forged electronic certificate physically (for example, on a screen or by printing).

SUMMARY

In view of the previous description, embodiments of the present specification provide methods, apparatuses, and devices for certificate verification, to verify authenticity of a certificate during electronic authentication. Embodiments of the present specification further provide methods, apparatuses, and devices for identity verification, to verify an identity based on authenticity of a certificate during electronic authentication.

The following technical solutions are used in the embodiments of the present specification:

An embodiment of the present specification provides a certificate verification method, including the following: acquiring at least two images of a to-be-verified certificate, where the at least two images are images obtained by performing image acquisition on the to-be-verified certificate under different acquisition conditions; obtaining, from the at least two images, a target image(s) that corresponds to the at least two images and that includes a coating feature, where the coating feature includes an image feature of a light-reflecting characteristic of a coating of the to-be-verified certificate in a corresponding image; and determining, based on the target image(s) corresponding to the at least two images, a probability that the to-be-verified certificate is an original.

An embodiment of the present specification further provides an identity verification method, including the following: acquiring at least two images of an identity certificate of a to-be-verified object, where the at least two images are images obtained by performing image acquisition on the identity certificate under different acquisition conditions; obtaining, from the at least two images, a first target image(s) that corresponds to the at least two images and that includes a coating feature, where the coating feature includes an image feature of a light-reflecting characteristic of a coating of the identity certificate in a corresponding image; determining, based on the first target image(s) corresponding to the at least two images, a probability that the identity certificate is an original; when it is determined that the identity certificate is an original based on the probability, obtaining a second target image(s) that includes identity information from one of the at least two images; verifying the identity information in the second target image(s) online to determine authenticity of the identity information; and determining authenticity of the identity of the to-be-verified object based on the authenticity of the identity information.

An embodiment of the present specification further provides a certificate verification apparatus, including an image acquisition module, an acquisition module, and a verification module, where the image acquisition module is configured to acquire at least two images of a to-be-verified certificate, where the at least two images are images obtained by performing image acquisition on the to-be-verified certificate under different acquisition conditions; the acquisition module is configured to obtain, from the at least two images, a target image(s) that corresponds to the at least two images and that includes a coating feature, where the coating feature includes an image feature of a light-reflecting characteristic of a coating of the to-be-verified certificate in a corresponding image; and the verification module is configured to determine, based on the target image(s) corresponding to the at least two images, a probability that the to-be-verified certificate is an original.

An embodiment of the present specification further provides an identity verification apparatus, including an image acquisition module, a first acquisition module, a first verification module, a second acquisition module, a networking module, and a second verification module, where the image acquisition module is configured to acquire at least two images of an identity certificate of a to-be-verified object, where the at least two images are images obtained by performing image acquisition on the identity certificate under different acquisition conditions; the first acquisition module is configured to obtain, from the at least two images, a first target image(s) that corresponds to the at least two images and that includes a coating feature, where the coating feature includes an image feature of a light-reflecting characteristic of a coating of the identity certificate in a corresponding image; the first verification module is configured to determine, based on the first target image(s) corresponding to the at least two images, a probability that the identity certificate is an original; the second acquisition module is configured to: when it is determined that the identity certificate is an original based on the probability, obtain a second target image(s) that includes identity information from one of the at least two images; the networking module is configured to verify the identity information in the second target image(s) online to determine authenticity of the identity information; and the second verification module is configured to determine authenticity of the identity of the to-be-verified object based on the authenticity of the identity information.

An embodiment of the present specification further provides a certificate verification electronic device, including the following: at least one processor; and at least one memory communicatively connected to the at least one processor, where the memory stores an instruction that can be executed by the at least one processor, and the instruction is executed by the at least one processor to enable the at least one processor to perform the following operations: acquiring at least two images of a to-be-verified certificate, where the at least two images are images obtained by performing image acquisition on the to-be-verified certificate under different acquisition conditions; obtaining, from the at least two images, a target image(s) that corresponds to the at least two images and that includes a coating feature, where the coating feature includes an image feature of a light-reflecting characteristic of a coating of the to-be-verified certificate in a corresponding image; and determining, based on the target image(s) corresponding to the at least two images, a probability that the to-be-verified certificate is an original.

An embodiment of the present specification further provides an identity verification electronic device, including the following: at least one processor; and at least one memory communicatively connected to the at least one processor, where the memory stores an instruction that can be executed by the at least one processor, and the instruction is executed by the at least one processor to enable the at least one processor to perform the following operations: acquiring at least two images of an identity certificate of a to-be-verified object, where the at least two images are images obtained by performing image acquisition on the identity certificate under different acquisition conditions; obtaining, from the at least two images, a first target image(s) that corresponds to the at least two images and that includes a coating feature, where the coating feature includes an image feature of a light-reflecting characteristic of a coating of the identity certificate in a corresponding image; determining, based on the first target image(s) corresponding to the at least two images, a probability that the identity certificate is an original; when it is determined that the identity certificate is an original based on the probability, obtaining a second target image(s) that includes identity information from one of the at least two images; verifying the identity information in the second target image(s) online to determine authenticity of the identity information; and determining authenticity of the identity of the to-be-verified object based on the authenticity of the identity information.

The previous at least one technical solution used in the embodiments of the present specification can achieve the following beneficial effects: The light-reflecting characteristic of the coating of the certificate can be used to form the coating feature in the acquired image under different acquisition conditions. Then, image recognition processing can be performed on the acquired image to determine the possibility that the acquired image comes from the original certificate.

BRIEF DESCRIPTION OF DRAWINGS

To describe technical solutions in embodiments of the present specification or in the existing technology more clearly, the following briefly describes the accompanying drawings needed for describing the embodiments or the existing technology. Clearly, the accompanying drawings in the following descriptions merely show some embodiments of the present specification, and a person of ordinary skill in the art can still derive other drawings from these accompanying drawings without creative efforts.

DESCRIPTION OF EMBODIMENTS

Figure 1:
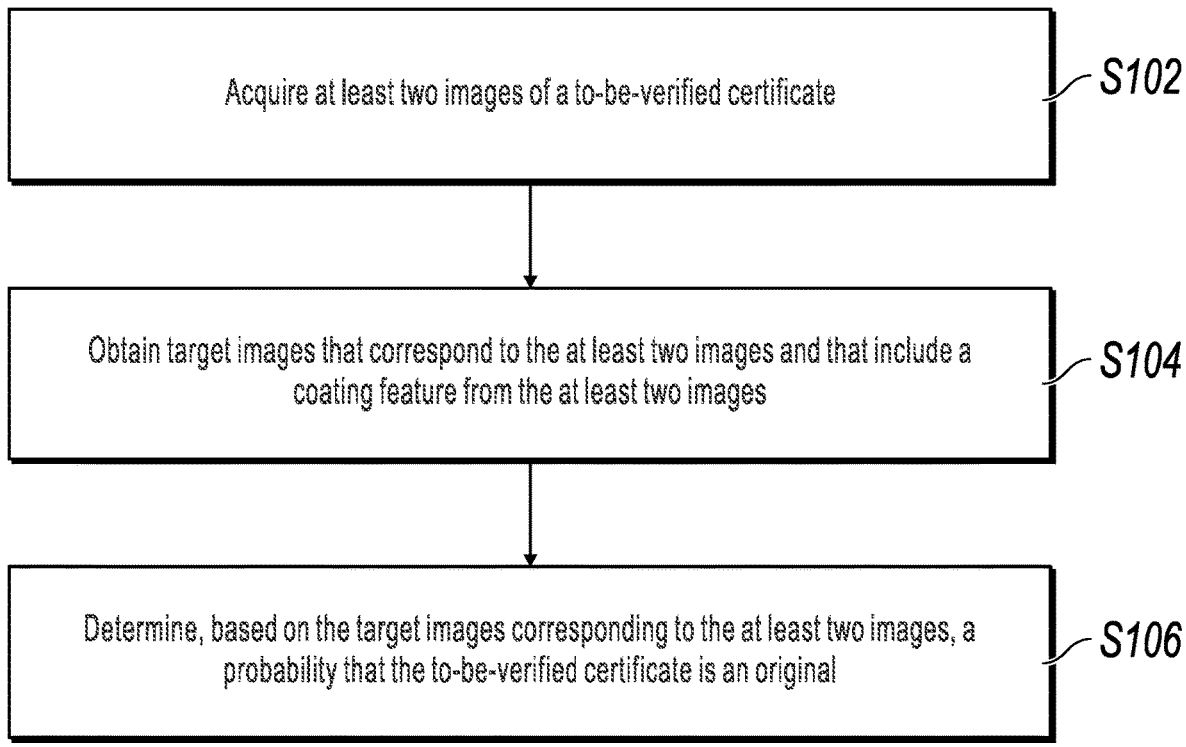
FIG. 1 is a flowchart illustrating a certificate verification method, according to an embodiment of the present specification.

To make a person skilled in the art better understand the technical solutions in the present specification, the following clearly describes the technical solutions in the embodiments of the present specification with reference to the accompanying drawings in the embodiments of the present specification. Clearly, the described embodiments are merely some but not all of the embodiments of the present specification. All other embodiments obtained by a person of ordinary skill in the art based on the embodiments of the present specification without creative efforts shall fall within the protection scope of the present application.

As described above, because the process of photographing the uploaded photos cannot be effectively monitored, vulnerabilities that are easily attacked are left in the electronic authentication process. However, in the existing solutions, the photos shot and uploaded by black industry users by using forged certificates cannot be recognized and easily cause deception. In addition, large-scale data processing needs to be performed later to recognize the photos before authenticity of the certificate is determined, resulting in low authentication efficiency.

In view of the previous description, embodiments of the present specification provide methods, apparatuses, and devices for certificate verification and identity verification. In one certificate verification method, at least two images of a certificate are acquired, and the at least two images are obtained by performing image acquisition on the certificate under different acquisition conditions, respectively. In such case, under different acquisition conditions, a light-reflecting characteristic of a coating of the certificate forms a corresponding coating feature in the certificate image. The coating feature includes an image feature of the light-reflecting characteristic of the coating of the to-be-verified certificate in the corresponding image, so that a possibility that the obtained certificate image comes from an original certificate can be determined based on the coating features corresponding to the at least two certificate images.

If the certificate is an original, the light-reflecting characteristic of the coating of the certificate forms the coating feature in the at least two certificate images, and then the probability that the certificate is an original can be determined by determining the coating feature in the image. On the contrary, if the coating of the certificate is missing, for example, the certificate is a certificate obtained by presenting a forged electronic certificate physically, for example, displaying the forged electronic certificate on a screen or by printing. In such case, because the at least two certificate images are obtained by photographing the forged electronic certificate, and the photographed forged electronic certificate does not carry the original coating of the certificate, there is no corresponding coating feature in the at least two certificate images. Therefore, a probability that the certificate is not an original can be determined based on the fact that there is no coating feature in the at least two certificate images. Alternatively, the certificate is a forged physical certificate, for example, information on the original certificate is modified. In such case, when the information on the original certificate is modified, the light-reflecting characteristic of the original coating of the certificate during image acquisition can be damaged, and there will be an intermittent coating feature in the at least two certificate images. In such case, the probability that the certificate is not an original can be determined based on the intermittent coating feature in the at least two certificate images.

The following describes in detail the technical solutions provided in the embodiments of the present application with reference to the accompanying drawings.

FIG. 1 is a flowchart illustrating a certificate verification method, according to an embodiment of the present specification.

As shown in FIG. 1, the certificate verification method can include the following steps:

S102: Acquire at least two images of a to-be-verified certificate, where the at least two images are images obtained by performing image acquisition on the to-be-verified certificate under different acquisition conditions.

In one embodiment, an image acquisition device acquires the image of the to-be-verified certificate. The acquisition condition is used to enable the light-reflecting characteristic of the coating of the certificate to form the corresponding coating feature in the acquired image.

In an embodiment, the acquisition condition can include an acquisition angle. For example, acquisition is performed multiple times at different angles between an acquisition direction of the image acquisition device and a normal line of the certificate. For example, acquisition is performed first when the acquisition direction is perpendicular to the certificate (i.e., the acquisition angle is zero), and then acquisition is performed at an oblique angle, so that acquired images of different angles are obtained. Due to the different acquisition angles, the light forms different reflection effects (i.e., the light-reflecting characteristics) on the coating of the certificate during acquisition, so that the acquired images have the corresponding coating feature. In other words, if the certificate is an original, the at least two images acquired at different angles all include the coating feature. If the certificate is not an original, because the certificate does not have the original coating, the at least two images acquired at different angles either have no coating feature, or have an incomplete coating feature, such as an intermittent coating feature.

In another embodiment, the acquisition condition can include an acquisition environment. For example, light conditions in the acquisition environment are different. In such case, because of the different ambient light, the light-reflecting characteristics of the coating of the certificate also form corresponding coating features in the acquired images. In other words, if the certificate is an original, because the certificate has the original coating, the at least two images acquired in acquisition environments of different light all include the coating feature. If the certificate is not an original, because the certificate does not have the original coating, the at least two images acquired under different light conditions either have no coating feature, or have an incomplete coating feature, such as an intermittent coating feature.

In one embodiment, an acquisition user can also be prompted, for example, by using a tone to perform acquisition operations under different conditions by using the image acquisition device.

In still another embodiment, because the video stream is usually acquired under multiple acquisition conditions such as different time, different acquisition angles, and different ambient light, and can provide more frames of acquired images, the at least two images of the to-be-verified certificate can also be extracted from the obtained video stream of the to-be-verified certificate. As such, the acquisition demands are reduced, the sources of the acquired images can be broadened, and the at least two images can be selected from more frames of images.

S104: Obtain the target images that correspond to the at least two images and that include a coating feature from the at least two images.

The coating feature includes an image feature of a light-reflecting characteristic of a coating of the to-be-verified certificate in a corresponding image.

In one embodiment, in the step of obtaining the coating feature corresponding to the at least two images, some image preprocessing, such as binarization, alignment, feature detection, etc. can be performed based on the at least two images. As such, after the preprocessing, a target image(s) that clearly includes the coating feature and is easy to process can be obtained, thereby improving verification efficiency and accuracy.

In an embodiment, the preprocessing can include image alignment processing. For example, the alignment processing includes searching for a location of a certificate in an image, and performing operations such as rotating, zooming, and clipping on the certificate in the image. Then, a certificate image after alignment processing is obtained from the at least two images. Here, the certificate image is an image included in a certificate boundary. As such, based on the aligned certificate image, processing of the image portion outside the certificate boundary can be omitted, and later processing is facilitated, thereby improving the verification efficiency and accuracy.

It is worthwhile to note that, the image alignment processing can be performed based on the characteristics of the certificate, and details are omitted here for simplicity.

In another embodiment, the preprocessing can include binarization processing, and the binarization processing can include dynamic binarization processing, or can include binarization processing based on a deep learning model. Because the coating feature is an image feature formed by the light-reflecting characteristic of the coating of the certificate in the image, after binarization, the coating feature is clearly presented in the at least two images. The image content other than the image content formed by the light-reflecting characteristic of the coating of the certificate becomes a background value after binarization. As such, a large amount of background value processing content can be omitted, thereby reducing the performance demand of the verification device and improving verification efficiency and accuracy.

It is worthwhile to note that, the binarization processing can be threshold binarization such as dynamic binarization and fixed threshold binarization, or can be binarization processing based on a deep learning model. Details are omitted here for simplicity.

In still another embodiment, detection can be performed based on the coating feature of the certificate to determine whether the at least two images include the coating feature. As such, later processing is stopped when it is detected that the coating feature is not included. The step of obtaining the target image(s) that includes a coating feature from the at least two images includes the following: detecting, based on a predetermined coating feature area, whether there is a coating feature corresponding to the coating feature area in the at least two images; and if yes, obtaining the target image(s) that includes a coating feature from the at least two images. Certainly, if there is no coating feature in the at least two images, the later verification processing can be stopped, or the operation is cleared, for example, the operation is returned to S102 to perform a verification operation again.

In one embodiment, image operators such as scale-invariant feature transform (SIFT) and speeded up robust feature (SURF) can be used to determine whether there is a coating feature in the at least two images.

S106: Determine, based on the target image(s) corresponding to the at least two images, a probability that the to-be-verified certificate is an original.

In one embodiment, the coating feature in the target images can be normalized based on the target images corresponding to the at least two images, depending on an actual processing demand. Then, the probability that the to-be-verified certificate is an original is determined based on the predetermined decision policy and the normalized value of the coating feature. The decision policy can be a decision relationship between the normalized value of the coating feature and the probability that the certificate is an original.

In an embodiment, the coating feature can be first extracted directly from the target images. Then, the values of the coating features corresponding to the target images corresponding to the at least two images are calculated, and the values of the coating features corresponding to the target images are summed up and normalized. Finally, the probability that the to-be-verified certificate is an original is determined based on the normalized value of the coating feature and the predetermined decision policy.

In another embodiment, the target images corresponding to the at least two images can be first divided into areas for feature extraction, for example, divided into N areas. Then every two areas are compared to obtain N comparison scores, and then the N comparison scores are summed up and normalized. Finally, the probability that the to-be-verified certificate is an original is determined based on the normalized value of the coating feature and the predetermined decision policy.

It is worthwhile to note that, in the embodiment of the present specification, the probability that the to-be-verified certificate is an original is described. Certainly, the probability that the to-be-verified certificate is a forged certificate is obtained after the probability that the to-be-verified certificate is an original is obtained.

In one embodiment, the probability that the certificate is an original can be determined depending on an actual application demand. Then, based on mapping relationships between the probability, the original certificate, the forged electronic certificate, and the forged physical certificate, it can be further determined whether the certificate is the original certificate, or whether the certificate is the forged electronic certificate or the forged physical certificate. Details are omitted here for simplicity.

In another embodiment, image features of specific areas of the certificate can also be processed to prevent these areas from being easily interfered by binarized results, such as face photo or metal chip parts. Because the locations of these parts relative to the certificate are definite, the image features of these areas can be processed separately, or the values of the image features of these areas can be excluded in advance, so as to reduce possible impact of the image feature values of these areas in later processing.

In the previous steps S102 to S106, because the coating of the certificate has the light-reflecting characteristic, and can form coating features in images acquired under different acquisition conditions, the images of the to-be-verified certificate under different acquisition conditions can be obtained first, and then the target image(s) that includes the coating feature can be obtained from the acquired images. Finally, the coating feature in the target image(s) is determined to determine the probability that the to-be-verified certificate is an original. As such, the probability that the to-be-verified certificate is an original can be identified accurately and quickly, efficiency and accuracy of certificate verification can be improved, and deception of the forged certificate can be prevented based on the probability.

For ease of understanding, the following describes a schematic process of certificate verification.

Figure 2:
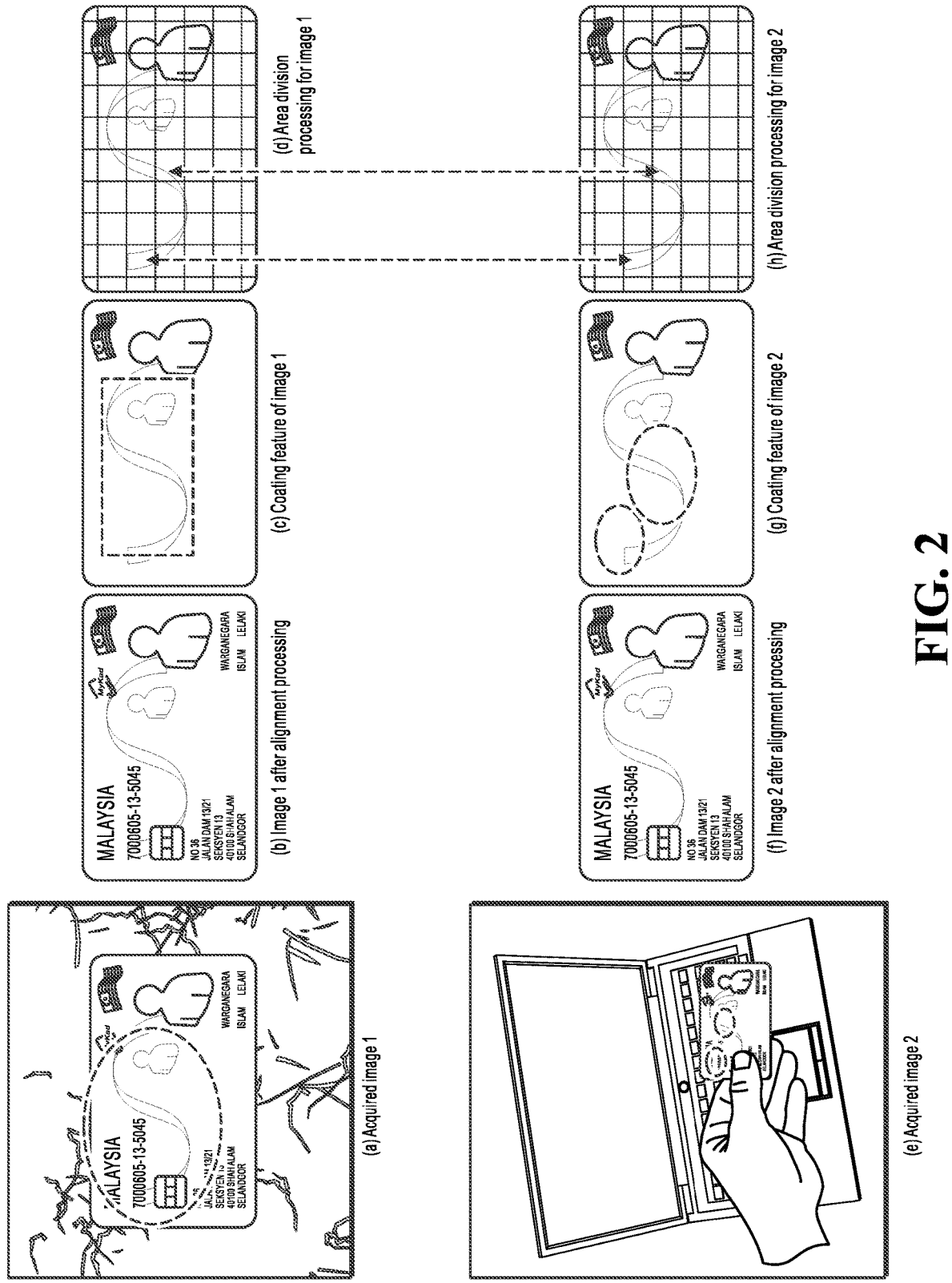
FIG. 2 is a schematic diagram of verifying a passport in a certificate verification method, according to an embodiment of the present specification.

FIG. 2 illustrates a process of verifying a passport certificate.

First, the original passport is placed under two acquisition conditions to acquire corresponding images. For example, the original certificate is placed in front of a background picture, and image 1 is acquired. The image result is shown in (a) in the figure. Then the original certificate is held in a hand, and image 2 is acquired. The image result is shown in (e) in the figure. In such case, because the passport is an original, a light-reflecting characteristic of a coating of the certificate forms coating features in image 1 and image 2, as shown in dashed-line blocks in (a) and (e) in the figure, respectively. There are clear coating features in both image 1 and image 2.

Next, target images that include these coating features are obtained.

Specifically, image 1 and image 2 can be aligned first, so that redundant background parts beyond the certificate range are removed and the certificate images are aligned. As such, aligned images of the same size can be obtained. Alignment results of image 1 and image 2 are shown in (b) and (f) in the figure, respectively. Then, the aligned images are binarized. Here, dynamic binarization processing is performed, and image features other than the image features formed by the light-reflecting characteristic of the coating of the certificate in the images are used as background values for processing. After the binarization, the coating feature results are shown in dashed-line blocks in (c) and (g) in the figure, respectively. Here, for ease of reading and identification, the color of the background values is adjusted from black to white. It can be seen from (c) and (g) in the figure that, the coating features in the obtained target images are pronounced.

Finally, the probability that the to-be-verified certificate is an original is determined based on the target images corresponding to the at least two images. Here, a target image is divided into N areas, and every two of the N areas are compared (as indicated by the dashed-line arrows in the figure), and then N comparison scores are obtained. Then the N comparison scores are summed up and normalized to obtain the normalized value of the coating feature. Finally, the probability that the passport is an original can be determined based on the decision policy. Here, for ease of description, N is 40, that is, each of the target images in (d) and (h) in the figure is divided into 5 rows and 8 columns to obtain 40 sub-areas. Then, every one of the 40 sub-areas in (d) and (h) is compared to obtain 40 comparison scores, and the 40 comparison scores are summed up and normalized. Finally, the probability that the passport is an original is determined based on the decision policy, which is 99.97%.

Based on the same inventive concept, embodiments of the present specification further provide a certificate verification apparatus, electronic device, and a non-volatile computer storage medium.

In consideration of the detailed description of the certificate verification methods in the previous embodiments, the corresponding content related to the apparatus, the device, and the non-volatile computer storage medium will be omitted in the following embodiments.

Figure 3:
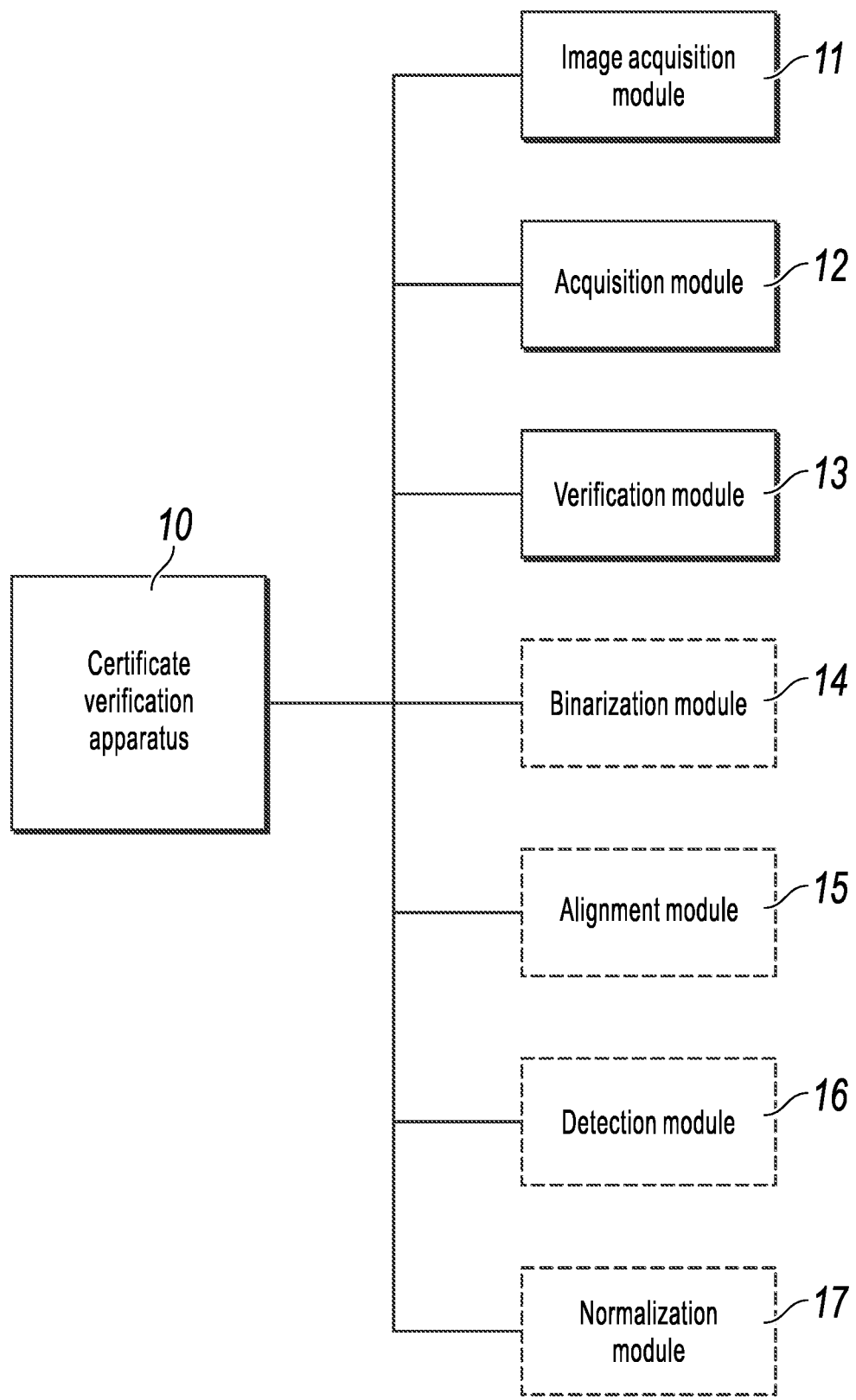
FIG. 3 is a schematic structural diagram illustrating a certificate verification apparatus, according to an embodiment of the present specification.

FIG. 3 is a schematic structural diagram illustrating a certificate verification apparatus, according to the present specification, where the dashed-line block represents an optional module.

As shown in FIG. 3, the certificate verification apparatus 10 includes an image acquisition module 11, an acquisition module 12, and a verification module 13. The image acquisition module 11 is configured to acquire at least two images of a to-be-verified certificate, where the at least two images are images obtained by performing image acquisition on the to-be-verified certificate under different acquisition conditions. The acquisition module 12 is configured to obtain, from the at least two images, a target image(s) that corresponds to the at least two images and that includes a coating feature, where the coating feature includes an image feature of a light-reflecting characteristic of a coating of the to-be-verified certificate in a corresponding image. The verification module 13 is configured to determine, based on the target image(s) corresponding to the at least two images, a probability that the to-be-verified certificate is an original.

In some embodiments, in the certificate verification apparatus 10, the acquisition conditions can include at least one of an acquisition angle and an acquisition environment.

In some embodiments, the image acquisition module 11 is configured to obtain the at least two images from a video stream corresponding to the to-be-verified certificate.

In some embodiments, the certificate verification apparatus 10 further includes a binarization module 14. The binarization module 14 is configured to perform image binarization processing on the at least two images to obtain a binarized image corresponding to the at least two images. The acquisition module 12 is configured to obtain the target images that correspond to the at least two images and that include a coating feature from the binarized image.

In some embodiments, the certificate verification apparatus 10 further includes an alignment module 15. The alignment module 15 is configured to perform image alignment processing on the at least two images. The acquisition module 12 is configured to obtain the target images that correspond to the at least two images and that include a coating feature from the at least two images after alignment processing.

In some embodiments, the certificate verification apparatus 10 further includes a detection module 16. The detection module 16 is configured to detect, based on a predetermined coating feature area, whether there is a coating feature corresponding to the coating feature area in the at least two images, and if yes, invoke the acquisition module 12. The acquisition module is configured to obtain the target images that correspond to the at least two images and that include a coating feature from the at least two images.

In some embodiments, the certificate verification apparatus 10 further includes a normalization module 17. The normalization module 17 is configured to perform normalization processing on the target images corresponding to the at least two images to obtain a normalized value of the coating feature. The verification module 13 is configured to determine, based on the normalized value of the coating feature and a predetermined decision policy, the probability that the to-be-verified certificate is an original, where the decision policy includes a decision relationship between the normalized value of the coating feature and the probability that the certificate is an original.

An embodiment of the present specification further provides a certificate verification electronic device, including the following: at least one processor; and at least one memory communicatively connected to the at least one processor, where the memory stores an instruction that can be executed by the at least one processor, and the instruction is executed by the at least one processor to enable the at least one processor to perform the following operations: acquiring at least two images of a to-be-verified certificate, where the at least two images are images obtained by performing image acquisition on the to-be-verified certificate under different acquisition conditions; obtaining, from the at least two images, a target image(s) that corresponds to the at least two images and that includes a coating feature, where the coating feature includes an image feature of a light-reflecting characteristic of a coating of the to-be-verified certificate in a corresponding image; and determining, based on the target image(s) corresponding to the at least two images, a probability that the to-be-verified certificate is an original.

An embodiment of the present specification further provides a non-volatile computer storage medium for certificate verification, where the non-volatile computer storage medium stores a computer executable instruction, and the computer executable instruction is set to perform the following operations: acquiring at least two images of a to-be-verified certificate, where the at least two images are images obtained by performing image acquisition on the to-be-verified certificate under different acquisition conditions; obtaining, from the at least two images, a target image(s) that corresponds to the at least two images and that includes a coating feature, where the coating feature includes an image feature of a light-reflecting characteristic of a coating of the to-be-verified certificate in a corresponding image; and determining, based on the target image(s) corresponding to the at least two images, a probability that the to-be-verified certificate is an original.

Based on the same inventive concept, embodiments of the present specification further provide an identity verification method, apparatus, and device.

Figure 4:
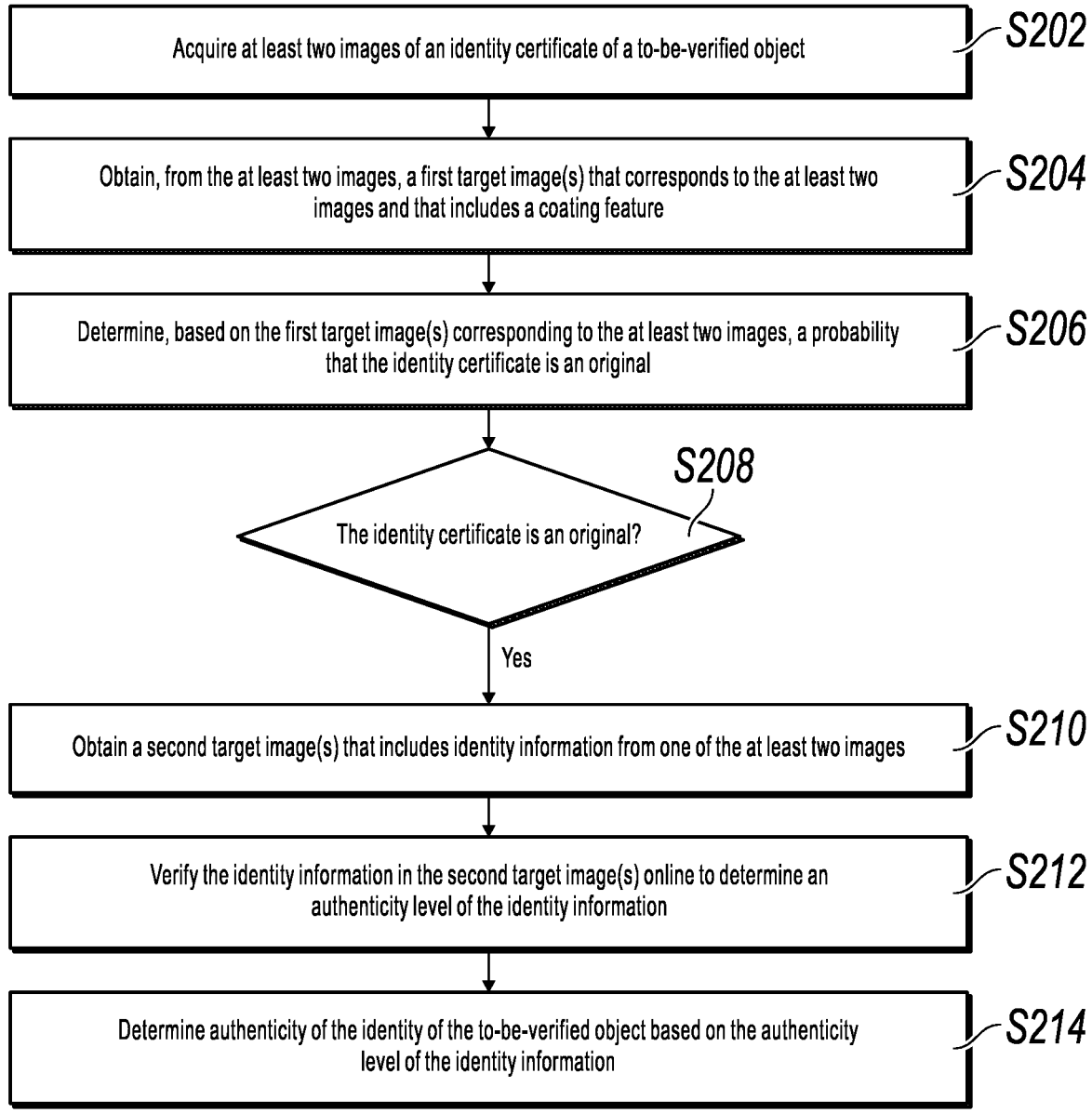
FIG. 4 is a flowchart illustrating an identity verification method, according to an embodiment of the present specification.

FIG. 4 is a flowchart illustrating an identity verification method, according to an embodiment of the present specification. The identity verification method can include the following steps:

S202: Acquire at least two images of an identity certificate of a to-be-verified object, where the at least two images are images obtained by performing image acquisition on the identity certificate under different acquisition conditions.

The identity certificate can include a certificate that can prove an identity of the to-be-verified object, such as a passport, an identity card, a driver's license, etc. The surface of the identity certificate further records identity information of the to-be-verified object, such as a name, a sex, an identity card number, etc.

S204: Obtain, from the at least two images, a first target image(s) that corresponds to the at least two images and that includes a coating feature, where the coating feature includes an image feature of a light-reflecting characteristic of a coating of the identity certificate in a corresponding image.

S206: Determine, based on the first target image(s) corresponding to the at least two images, a probability that the identity certificate is an original.

S208: Determine, based on the probability that the identity certificate is an original, whether the identity certificate is an original, and if yes, perform S210.

It is worthwhile to note that, in the step of determining whether the identity certificate is an original, the determining result can be further output by using a prompt such as a voice or a text. When it is determined that the identity certificate is not an original, the operation can be cleared, for example, the operation returns to S202.

S210: Obtain a second target image(s) that includes identity information from one of the at least two images.

S212: Verify the identity information in the second target image(s) online to determine an authenticity level of the identity information.

S214: Determine authenticity of the identity of the to-be-verified object based on the authenticity level of the identity information.

It is worthwhile to note that, the content of steps S202 to S206 is similar to the content of steps S102 to S106 of the certificate verification method described in the previous embodiment, and details are omitted here for simplicity.

In the previous steps S202 to S214, because the light-reflecting characteristic of the coating of the identity certificate can form the corresponding coating features in the acquired images under different acquisition conditions, it can be accurately and quickly determined whether the identity certificate of the to-be-verified object is an original, and then the authenticity level of the identity information can be verified online when the identity certificate is an original, and the authenticity of the identity of the to-be-verified object can be determined based on the online verification result. As such, accuracy and efficiency of identity verification are improved, and deception of the forged certificate during electronic authentication can be effectively prevented based on the identity result of the to-be-verified object.

In consideration of the detailed description of the identity verification method in the previous embodiments, the corresponding content related to the identity verification apparatus, device, and non-volatile computer storage medium will be omitted in the following embodiments.

Figure 5:
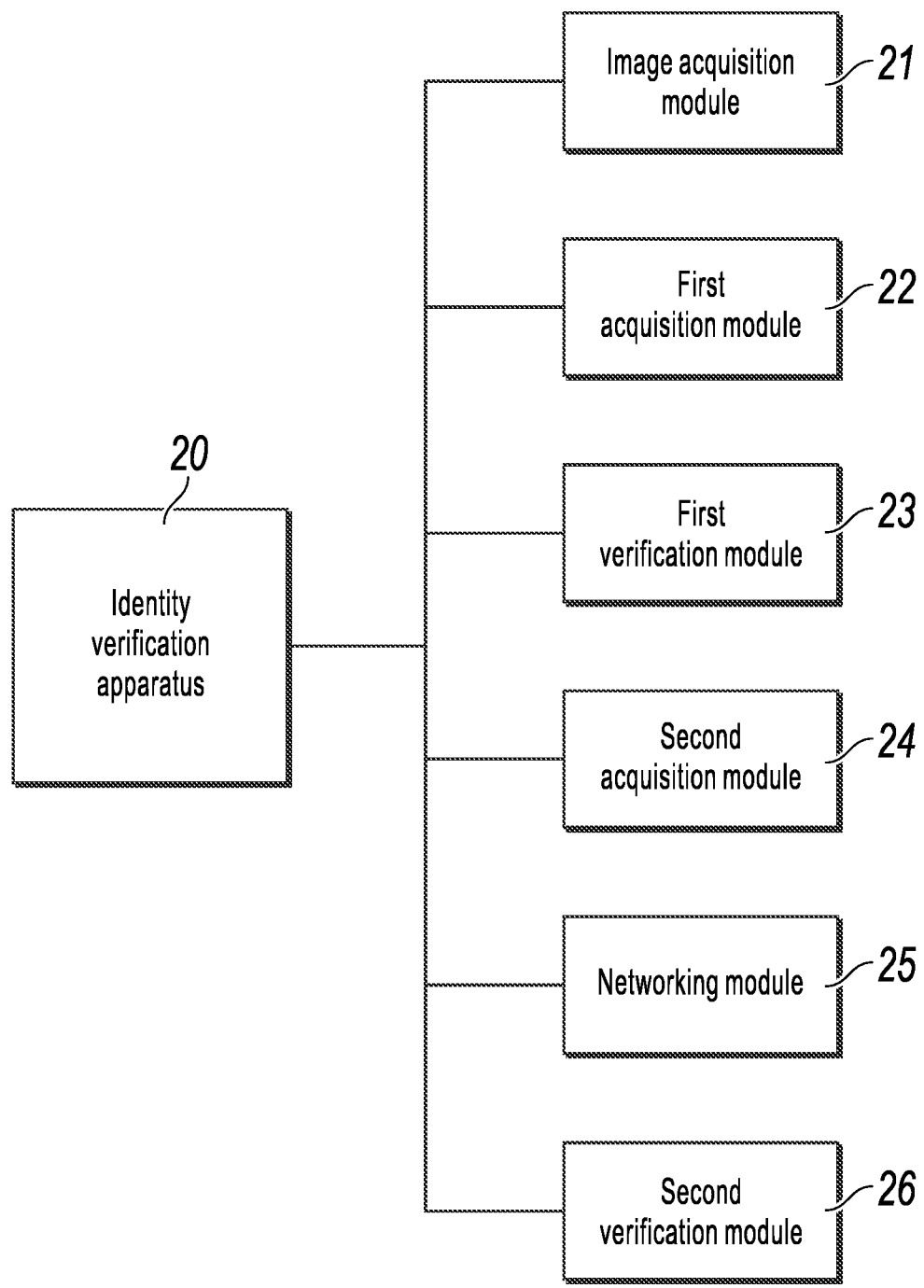
FIG. 5 is a schematic structural diagram illustrating an identity verification apparatus, according to an embodiment of the present specification.

FIG. 5 is a schematic structural diagram illustrating an identity verification apparatus, according to an embodiment of the present specification.

As shown in FIG. 5, the identity verification apparatus 20 includes an image acquisition module 21, a first acquisition module 22, a first verification module 23, a second acquisition module 24, a networking module 25, and a second verification module 26. The image acquisition module 21 is configured to acquire at least two images of an identity certificate of a to-be-verified object, where the at least two images are images obtained by performing image acquisition on the identity certificate under different acquisition conditions. The first acquisition module 22 is configured to obtain, from the at least two images, a first target image(s) that corresponds to the at least two images and that includes a coating feature, where the coating feature includes an image feature of a light-reflecting characteristic of a coating of the identity certificate in a corresponding image. The first verification module 23 is configured to determine, based on the first target image(s) corresponding to the at least two images, a probability that the identity certificate is an original. The second acquisition module 24 is configured to: when it is determined that the identity certificate is an original based on the probability, obtain a second target image(s) that includes identity information from one of the at least two images. The networking module 25 is configured to verify the identity information in the second target image(s) online to determine authenticity of the identity information. The second verification module 26 is configured to determine authenticity of the identity of the to-be-verified object based on the authenticity of the identity information.

An embodiment of the present specification further provides an identity verification electronic device, including the following: at least one processor; and at least one memory communicatively connected to the at least one processor, where the memory stores an instruction that can be executed by the at least one processor, and the instruction is executed by the at least one processor to enable the at least one processor to perform the following operations: acquiring at least two images of an identity certificate of a to-be-verified object, where the at least two images are images obtained by performing image acquisition on the identity certificate under different acquisition conditions; obtaining, from the at least two images, a first target image(s) that corresponds to the at least two images and that includes a coating feature, where the coating feature includes an image feature of a light-reflecting characteristic of a coating of the identity certificate in a corresponding image; determining, based on the first target image(s) corresponding to the at least two images, a probability that the identity certificate is an original; when it is determined that the identity certificate is an original based on the probability, obtaining a second target image(s) that includes identity information from one of the at least two images; verifying the identity information in the second target image(s) online to determine authenticity of the identity information; and determining authenticity of the identity of the to-be-verified object based on the authenticity of the identity information.

An embodiment of the present specification further provides a non-volatile computer storage medium for identity verification, where the non-volatile computer storage medium stores a computer executable instruction, and the computer executable instruction is set to perform the following operations: acquiring at least two images of an identity certificate of a to-be-verified object, where the at least two images are images obtained by performing image acquisition on the identity certificate under different acquisition conditions; obtaining, from the at least two images, a first target image(s) that corresponds to the at least two images and that includes a coating feature, where the coating feature includes an image feature of a light-reflecting characteristic of a coating of the identity certificate in a corresponding image; determining, based on the first target image(s) corresponding to the at least two images, a probability that the identity certificate is an original; when it is determined that the identity certificate is an original based on the probability, obtaining a second target image(s) that includes identity information from one of the at least two images; verifying the identity information in the second target image(s) online to determine authenticity of the identity information; and determining authenticity of the identity of the to-be-verified object based on the authenticity of the identity information.

Some embodiments of the present specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some embodiments, multi-tasking and concurrent processing is feasible or can be advantageous.

The embodiments in the present specification are described in a progressive way. For same or similar parts of the embodiments, references can be made to the embodiments mutually. Each embodiment focuses on a difference from other embodiments. Especially, an apparatus embodiment, a device embodiment, a non-volatile computer storage medium embodiment are similar to a method embodiment, and therefore are described briefly. For related parts, references can be made to the descriptions in the method embodiment.

The apparatus, the device, and the non-volatile computer storage medium provided in the embodiments of the present specification correspond to the method. Therefore, the apparatus, the device, and the non-volatile computer storage medium also have beneficial technical effects similar to those of the corresponding method. The beneficial technical effects of the method are described in detail above, so the beneficial technical effects of the corresponding apparatus, device, and non-volatile computer storage medium are omitted here.

In the 1990s, whether a technical improvement is a hardware improvement (for example, an improvement to a circuit structure, such as a diode, a transistor, or a switch) or a software improvement (an improvement to a method procedure) can be clearly distinguished. However, as technologies develop, current improvements to many method procedures can be considered as direct improvements to hardware circuit structures. A designer usually programs an improved method procedure into a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the PLD is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL). The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and an apparatus configured to implement various functions in the controller can also be considered as a structure in the hardware component. Or the apparatus configured to implement various functions can even be considered as both a software module implementing the method and a structure in the hardware component.

The system, apparatus, module, or unit illustrated in the previous embodiments can be implemented by using a computer chip or an entity, or can be implemented by using a product having a certain function. A typical implementation device is a computer. The computer can be, for example, a personal computer, a laptop computer, a cellular phone, a camera phone, a smart phone, a personal digital assistant, a media player, a navigation device, an e-mail device, a game console, a tablet computer, a wearable device, or a combination of any of these devices.

For ease of description, the previous apparatus is described by dividing functions into various units. Certainly, when the present application is implemented, a function of each unit can be implemented in one or more pieces of software and/or hardware.

A person skilled in the art should understand that the embodiments of the present disclosure can be provided as a method, a system, or a computer program product. Therefore, the present disclosure can use a form of hardware only embodiments, software only embodiments, or embodiments with a combination of software and hardware. Moreover, the present disclosure can use a form of a computer program product that is implemented on one or more computer-usable storage media (including but not limited to a magnetic disk memory, a CD-ROM, and an optical memory) that include computer-usable program code.

The present disclosure is described with reference to the flowcharts and/or block diagrams of the method, the device (system), and the computer program product according to the embodiments of the present disclosure. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific way, so the instructions stored in the computer readable memory generate an artifact that includes an instruction apparatus. The instruction apparatus implements a specific function in one or more processes in the flowcharts and/or in one or more blocks in the block diagrams.

These computer program instructions can be loaded onto the computer or another programmable data processing device, so a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

In a typical configuration, a computing device includes one or more processors (CPUs), one or more input/output interfaces, one or more network interfaces, and one or more memories.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static RAM (SRAM), a dynamic RAM (DRAM), a RAM of another type, a read-only memory (ROM), an electrically erasable programmable ROM (EEPROM), a flash memory or another memory technology, a compact disc ROM (CD-ROM), a digital versatile disc (DVD), or another optical storage, a cassette, a cassette magnetic disk storage, or another magnetic storage device or any other non-transmission medium. The computer storage medium can be configured to store information that can be accessed by a computing device. Based on the definition in the present specification, the computer readable medium does not include transitory media such as a modulated data signal and carrier.

It is worthwhile to further note that, the terms "include", "contain", or their any other variants are intended to cover a non-exclusive inclusion, so a process, a method, a product or a device that includes a list of elements not only includes those elements but also includes other elements which are not expressly listed, or further includes elements inherent to such process, method, product or device. Without more constraints, an element preceded by "includes a . . . " does not preclude the existence of additional identical elements in the process, method, product or device that includes the element.

The present application can be described in the general context of executable computer instructions executed by a computer, for example, a program module. Generally, the program module includes a routine, a program, an object, a component, a data structure, etc. executing a specific task or implementing a specific abstract data type. The present application can alternatively be practiced in distributed computing environments in which tasks are performed by remote processing devices that are connected through a communications network. In a distributed computing environment, the program module can be located in both local and remote computer storage media including storage devices.

The previous descriptions are merely embodiments of the present application, and are not intended to limit the present application. A person skilled in the art can make various modifications and changes to the present application. Any modification, equivalent replacement, or improvement made without departing from the spirit and principle of the present application shall fall within the scope of the claims in the present application.

What is claimed is:

1. A computer-implemented certificate verification method, comprising:
    obtaining at least two images of a certificate, wherein the at least two images are acquired under different acquisition conditions;
    obtaining, from the at least two images, at least two target images that correspond to respective images of the at least two images and that each comprise an image of a light-reflective coating of the certificate;
    extracting values corresponding to the light-reflective coating from the at least two target images;
    determining, based on the extracted values corresponding to the light-reflective coating from the at least two target images, that the certificate is authentic or that the certificate is inauthentic; and
    verifying identify information of the certificate based at least on determining that the certificate is authentic or that the certificate is inauthentic.

2. The computer-implemented method of claim 1, wherein the different acquisition conditions comprise at least one of:
    different acquisition angles and different lighting environments.

3. The computer-implemented method of claim 1, wherein obtaining the at least two images of the certificate comprises:
    obtaining the at least two images from a video of the certificate.

4. The computer-implemented method of claim 1, wherein obtaining the at least two target images comprises:
    performing image binarization processing on the at least two images to obtain binarized images corresponding to the at least two images; and
    obtaining the at least two target images from the binarized images.

5. The computer-implemented method of claim 1, wherein obtaining the at least two target images comprises:
    performing image alignment processing on the at least two images to obtained aligned images corresponding to the at least two images; and
    obtaining the at least two target images from the aligned images.

6. The computer-implemented method of claim 1, wherein determining that the certificate is authentic or that the certificate is inauthentic comprises:
dividing each of the at least two target images into areas;
comparing corresponding areas between the at least two target images, to obtain comparison scores; and
determining, based on the comparison scores, that the certificate is authentic or that the certificate is inauthentic.

7. The computer-implemented method of claim 1, wherein determining that the certificate is authentic or that the certificate is inauthentic comprises:
performing normalization processing on the extracted values to obtain a normalized value corresponding to the light-reflective coating; and
determining, based on the normalized value and a predetermined decision policy, that the certificate is authentic or that the certificate is inauthentic, wherein the predetermined decision policy comprises a decision relationship between the normalized value and a decision that the certificate is authentic or inauthentic.

8. A non-transitory, computer-readable medium storing one or more instructions that, when executed by a computer system, cause the computer system to perform operations comprising:
obtaining at least two images of a certificate, wherein the at least two images are acquired under different acquisition conditions;
obtaining, from the at least two images, at least two target images that correspond to respective images of the at least two images and that each comprise an image of a light-reflective coating of the certificate;
extracting values corresponding to the light-reflective coating from the at least two target images;
determining, based on the extracted values corresponding to the light-reflective coating from the at least two target images, that the certificate is authentic or that the certificate is inauthentic; and
verifying identify information of the certificate based at least on determining that the certificate is authentic or that the certificate is inauthentic.

9. The computer-readable medium of claim 8, wherein the different acquisition conditions comprise at least one of: different acquisition angles and different lighting environments.

10. The computer-readable medium of claim 8, wherein obtaining the at least two images of the certificate comprises:
obtaining the at least two images from a video of the certificate.

11. The computer-readable medium of claim 8, wherein obtaining the at least two target images comprises:
performing image binarization processing on the at least two images to obtain binarized images corresponding to the at least two images; and
obtaining the at least two target images from the binarized images.

12. The computer-readable medium of claim 8, wherein obtaining the at least two target images comprises:
performing image alignment processing on the at least two images to obtained aligned images corresponding to the at least two images; and
obtaining the at least two target images from the aligned images.

13. The computer-readable medium of claim 8, wherein determining that the certificate is authentic or that the certificate is inauthentic comprises:
dividing each of the at least two target images into areas;
comparing corresponding areas between the at least two target images, to obtain comparison scores; and
determining, based on the comparison scores, that the certificate is authentic or that the certificate is inauthentic.

14. The computer-readable medium of claim 8, wherein determining that the certificate is authentic or that the certificate is inauthentic comprises:
performing normalization processing on the extracted values to obtain a normalized value corresponding to the light-reflective coating; and
determining, based on the normalized value and a predetermined decision policy, that the certificate is authentic or that the certificate is inauthentic, wherein the predetermined decision policy comprises a decision relationship between the normalized value and a decision that the certificate is authentic or inauthentic.

15. A computer-implemented system, comprising:
one or more computers; and
one or more computer memory devices interoperably coupled with the one or more computers and having tangible, non-transitory, machine-readable media storing one or more instructions that, when executed by the one or more computers, cause the one or more computers to perform one or more operations comprising:
obtaining at least two images of a certificate, wherein the at least two images are acquired under different acquisition conditions;
obtaining, from the at least two images, at least two target images that correspond to respective images of the at least two images and that each comprise an image of a light-reflective coating of the certificate;
extracting values corresponding to the light-reflective coating from the at least two target images;
determining, based on the extracted values corresponding to the light-reflective coating from the at least two target images, that the certificate is authentic or that the certificate is inauthentic; and
verifying identify information of the certificate based at least on determining that the certificate is authentic or that the certificate is inauthentic.

16. The computer-implemented system of claim 15, wherein the different acquisition conditions comprise at least one of: different acquisition angles and different lighting environments.

17. The computer-implemented system of claim 15, wherein
obtaining the at least two images of the certificate comprises:
obtaining the at least two images from a video of the certificate.

18. The computer-implemented system of claim 15, wherein
obtaining the at least two target images comprises:
performing image binarization processing on the at least two images to obtain binarized images corresponding to the at least two images; and
obtaining the at least two target images from the binarized images.

19. The computer-implemented system of claim 15, wherein obtaining the at least two target images comprises:
performing image alignment processing on the at least two images to obtained aligned images corresponding to the at least two images; and
obtaining the at least two target images from the aligned images.

20. The computer-implemented system of claim 15, wherein determining that the certificate is authentic or that the certificate is inauthentic comprises:
- dividing each of the at least two target images into areas;
- comparing corresponding areas between the at least two target images, to obtain comparison scores; and
- determining, based on the comparison scores, that the certificate is authentic or that the certificate is inauthentic.

21. The computer-implemented system of claim 15, wherein determining that the certificate is authentic or that the certificate is inauthentic comprises:
- performing normalization processing on the extracted values to obtain a normalized value corresponding to the light-reflective coating; and
- determining, based on the normalized value and a predetermined decision policy, that the certificate is authentic or that the certificate is inauthentic, wherein the predetermined decision policy comprises a decision relationship between the normalized value and a decision that the certificate is authentic or inauthentic.

\* \* \* \* \*